(12) United States Patent
Forsythe et al.

(10) Patent No.: US 6,217,053 B1
(45) Date of Patent: Apr. 17, 2001

(54) RECREATIONAL VEHICLE SUPPORT APPARATUS

(76) Inventors: Carl Forsythe, 16 Anson Lane W., Mill Cove, New Brunswick (CA), E4C 3W4; Gerald M. Belliveau, 14 Barker Street, Oromocto, New Brunswick (CA), E2V 2K5

( * ) Notice: Subject to any disclaimer, the term of this patent is extended or adjusted under 35 U.S.C. 154(b) by 0 days.

(21) Appl. No.: 09/472,230

(22) Filed: Dec. 27, 1999

(30) Foreign Application Priority Data

Jan. 7, 1998 (CA) .................................................... 2257760

(51) Int. Cl.[7] .................................................... B60P 3/10
(52) U.S. Cl. .................................. 280/414.3; 280/414.1; 114/51; 410/24; 414/482
(58) Field of Search ........................... 280/414.1, 414.2, 280/414.3; 414/917, 471, 474, 482, 483, 495; 410/24, 26; 114/48, 51

(56) References Cited

U.S. PATENT DOCUMENTS

| | | | |
|---|---|---|---|
| 2,371,461 | 3/1945 | Newell | 61/67 |
| 2,427,667 | 9/1947 | Gilbert | 214/65 |
| 3,169,644 | 2/1965 | Godbersen | 214/61 |
| 3,730,542 | * 11/1992 | Chadwick | 414/483 |
| 4,068,772 | 1/1978 | Prudhomme | 214/515 |
| 4,221,420 | 9/1980 | Vencill et al. | 296/1 A |
| 4,243,242 | 1/1981 | Waits | 280/414 R |
| 4,278,375 | * 7/1981 | Drake et al. | 414/483 |
| 4,286,800 | 9/1981 | Lomas | 280/414 B |
| 4,318,632 | * 3/1982 | Fortmeyer | 280/414.1 |
| 4,749,317 | * 6/1988 | Daniel | 414/482 |
| 4,784,545 | 11/1988 | Lawrence | 410/26 |
| 4,880,250 | * 11/1989 | Cravens et al. | 280/414.1 |
| 5,152,656 | 10/1992 | Potter | 414/462 |
| 5,165,706 | * 11/1992 | Fond | 280/414.1 |
| 5,184,914 | 2/1993 | Basta | 405/3 |
| 5,275,505 | 1/1994 | Wilcox | 405/3 |
| 5,275,526 | * 1/1994 | Moseley | 414/495 |
| 5,380,143 | 1/1995 | Mohan | 414/495 |
| 5,468,115 | 11/1995 | Aluis | 414/556 |
| 5,590,997 | 1/1997 | Fredrikson et al. | 414/541 |
| 5,772,360 | 6/1998 | Wood | 405/3 |
| 5,772,388 | 6/1998 | Clark | 414/484 |
| 5,863,173 | 1/1999 | Bremner | 414/462 |

FOREIGN PATENT DOCUMENTS

| 063651 | 11/1982 | (EP) . | |
|---|---|---|---|
| 2239430 | * 3/1991 | (GB) | 414/483 |

* cited by examiner

*Primary Examiner*—Daniel G. DePumpo
(74) *Attorney, Agent, or Firm*—Mario Theriault

(57) ABSTRACT

An apparatus which is transformable from a boat lift to a trailer. The apparatus is movable on skids in a boat lift mode and on wheels in a trailer mode. A pair of posts on a main frame supports a pantographic linkwork to which is affixed a watercraft lifting cradle. A winch is connected to the main frame and to the linkwork for raising and lowering the cradle. A leveling mechanism is used for adjusting the cradle on a level when the apparatus is installed on a sloping shore. An upper deck framework is provided above the front end of the main frame. The cradle is usable for raising and moving a first recreational vehicle over the upper deck framework and for raising a second recreational vehicle above the rear end of the main frame. A third recreational vehicle is transportable on the main frame under the first and second recreational vehicles.

20 Claims, 7 Drawing Sheets

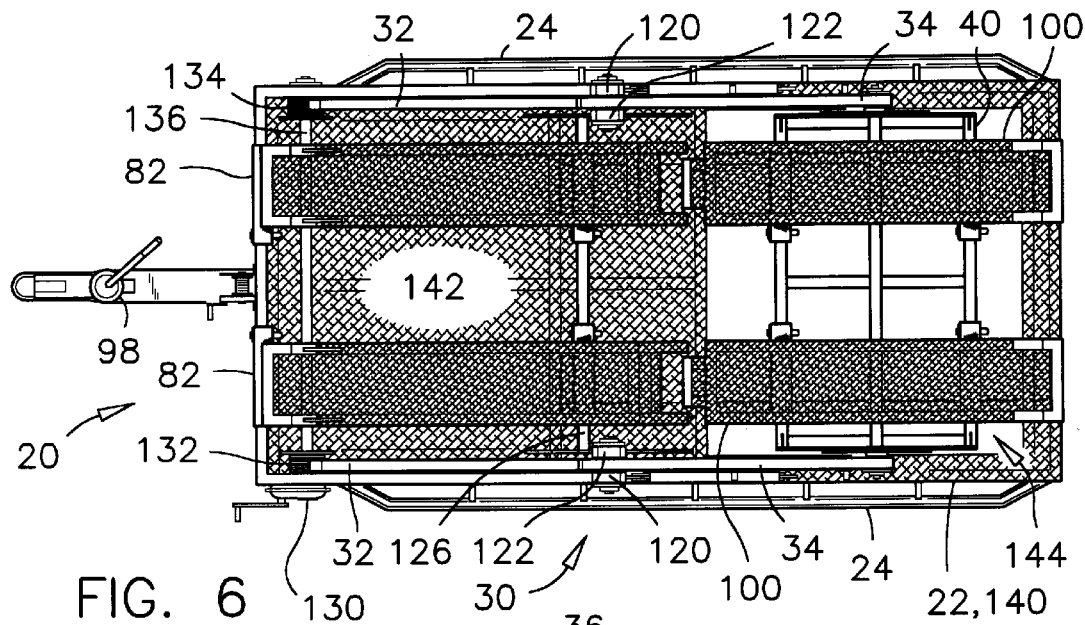
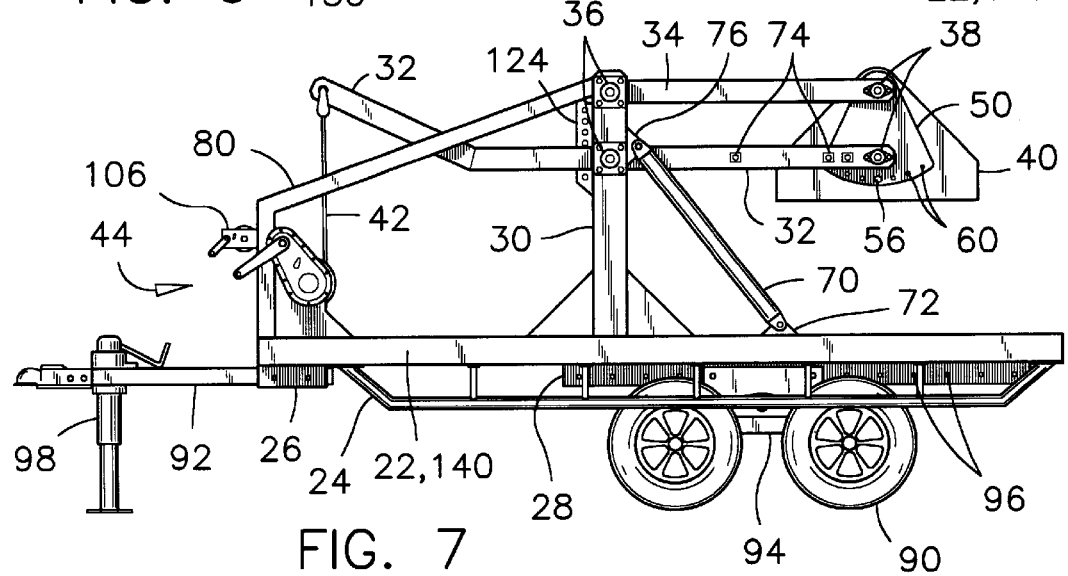
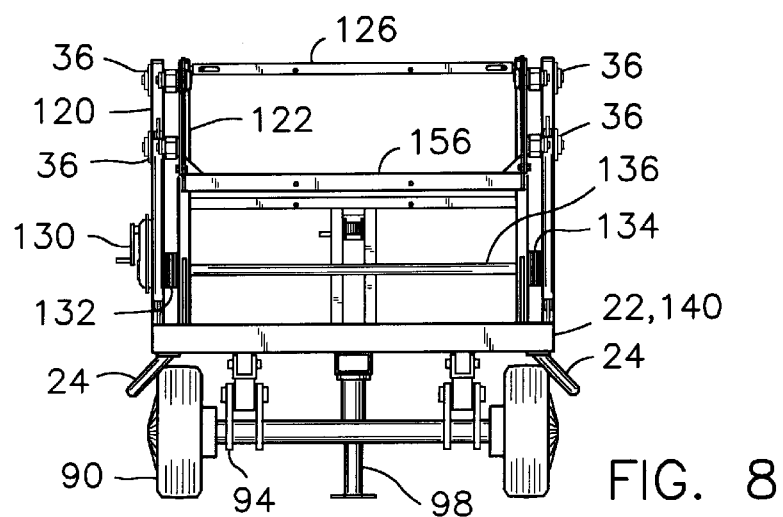

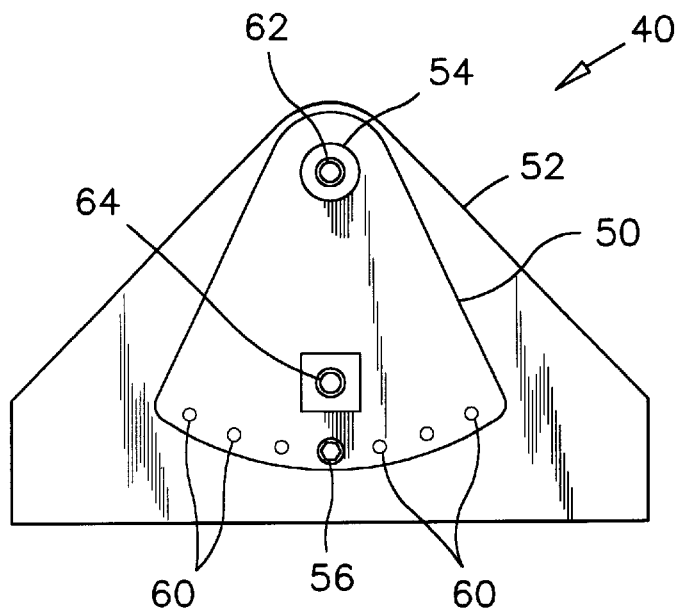
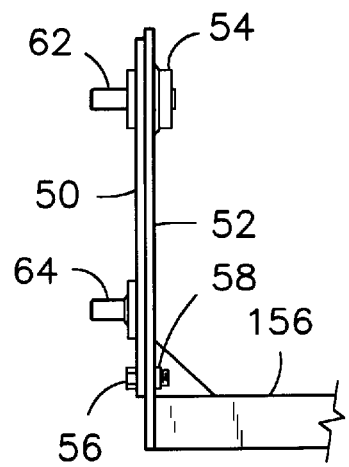
FIG. 11　　　　　FIG. 12
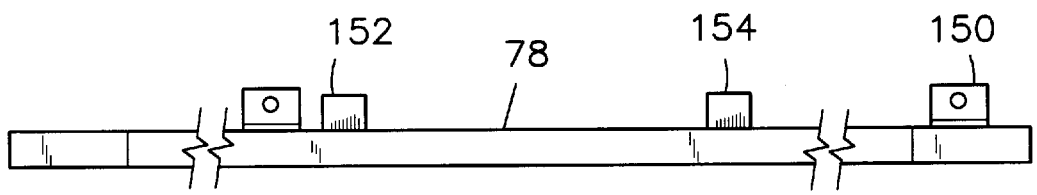
FIG. 13
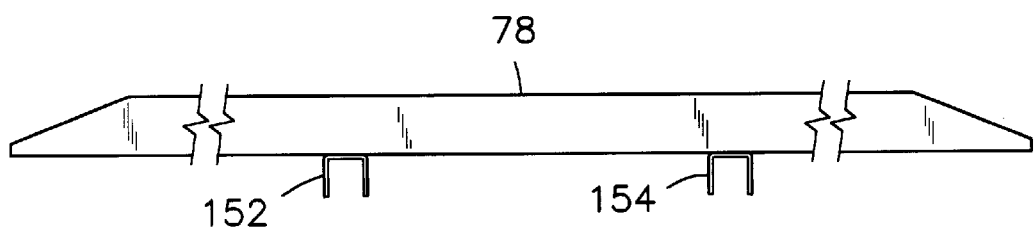
FIG. 14
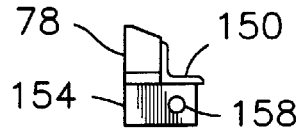
FIG. 15

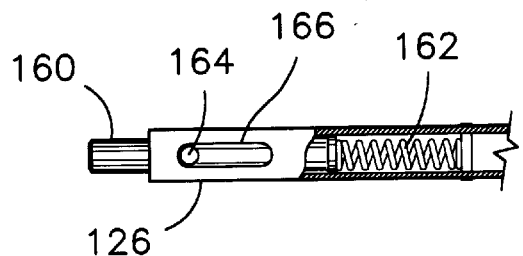
FIG. 16
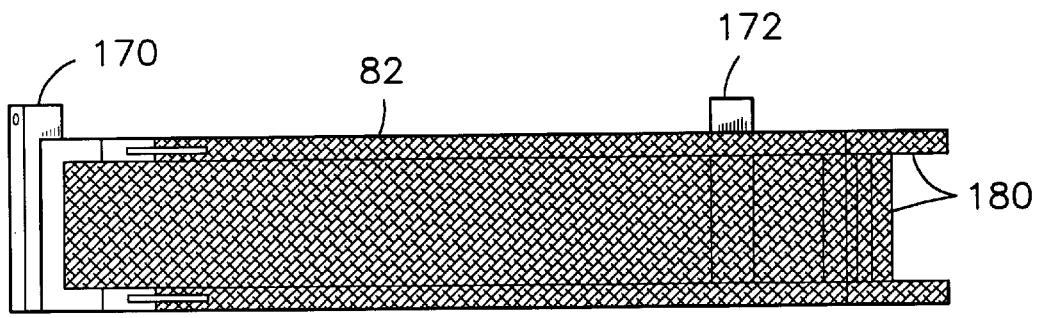
FIG. 17
FIG. 18
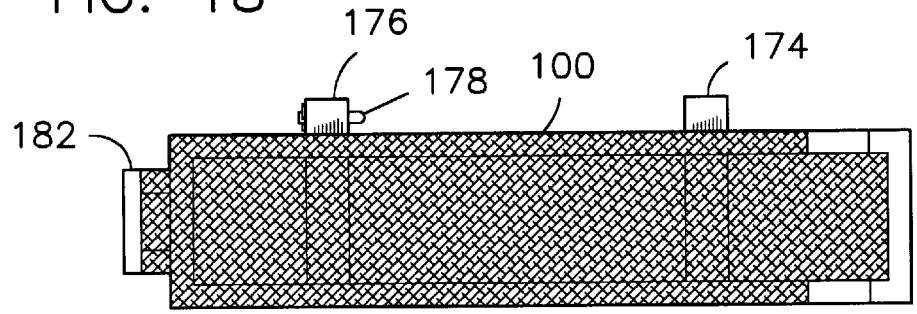
FIG. 19
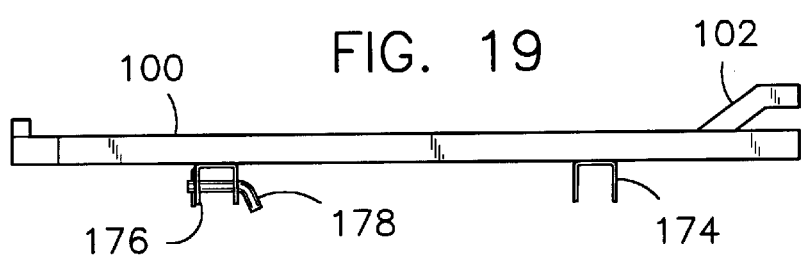
FIG. 20

RECREATIONAL VEHICLE SUPPORT APPARATUS

FIELD OF THE INVENTION

The present invention relates to a support apparatus that is transformable from a boat lift to a trailer. In the boat lift mode, the support apparatus is set along a shore for raising a watercraft out of the water for protecting the watercraft from wave actions. In the trailer mode, the support apparatus is used for transporting several recreational vehicles in a low profile arrangement.

BACKGROUND OF THE INVENTION

The words watercraft, boat and craft are used interchangeably herein to designate a small power boat, a jet-powered personal sled-type craft, a pedalling-type craft, a row boat, a scull, a kayak, a small sail boat or other recreational boats of the like. Similarly, the term all-terrain-vehicle (ATV) is used herein to designate the three or four-wheel recreational vehicle, a golf cart, a lawn tractor, a motorized buggy or wheeled equipment of the like.

Between uses, a watercraft is normally tied alongside a dock or a shore and is subject to wave actions. On a big lake or along a coast outside a harbour, large waves may push and shake the boat against the dock, the beach or a rocky shoreline, and damage the craft. Therefore it is preferable to raise the boat out of the water during non-use periods and during periods of strong wind. Also, in most cases, a watercraft is used during one season only and must be transported and stored away during the colder months. Consequently, a trailer and a watercraft lift are preferably required by the owner of a watercraft.

It is also common for a family that is initiated to aquatic activities to own a pair of boats such that the fun of the activity can be simultaneously shared between members of the family. It is also common for a family having enthusiasm for outdoor activities to own one or two all-terrain-vehicles (ATVs), which also must be transported to a storage space when the weather conditions are not appropriate for the use of these vehicles. It is therefore common for vacationers traveling back from a resort, to experience the need to simultaneously transport a number of recreational vehicles on a same trailer.

Examples of boat lifts of the prior art are illustrated in the following documents:

U.S. Pat. No. 5,184,914 issued on Feb. 9, 1993 to S. T. Basta;
U.S. Pat. No. 5,275,505 issued on Jan. 4, 1994 to P. E. Wilcox;
U.S. Pat. No. 5,772,360 issued on Jun. 30, 1998 to D. M. Wood.

Examples of trailers of the prior art for handling, transporting or lifting a boat are illustrated in the following documents:

U.S. Pat. No. 2,371,461 issued on Mar. 13, 1945 to F. S. Newell;
U.S. Pat. No. 2,427,667 issued on Sep. 23, 1947 to H. H. Gilbert;
U.S. Pat. No. 3,169,644 issued on Feb. 16, 1965 to B. L. Godbersen;
U.S. Pat. No. 4,286,800 issued on Sep. 1, 1981 to J. W. Lomas;
U.S. Pat. No. 4,318,632 issued on Mar. 9, 1982 to G. W. Fortmeyer;
U.S. Pat. No. 5,380,143 issued on Jan. 10, 1995 to P. Mohan;
U.S. Pat. No. 5,590,997 issued on Jan. 7, 1997 to M. Fredriksson et al.
EP 063,651 published on Nov. 3, 1982 by F. H. Van Den Broek.

Examples of trailers of the prior art having a structure for simultaneously transporting a boat and at least another vehicle are illustrated in the following documents:

U.S. Pat. No. 4,068,772 issued on Jan. 17, 1978 to C. R. Prudhomme;
U.S. Pat. No. 4,221,420 issued on Sep. 9, 1980 to L. E. Vencill et al.;
U.S. Pat. No. 4,243,242 issued on Jan. 6, 1981 to G. D. Waits;
U.S. Pat. No. 4,784,545 issued on Nov. 15, 1988 to D. G. Lawrence;
U.S. Pat. No. 5,152,656 issued on Oct. 6, 1992 to G. R. Potter;
U.S. Pat. No. 5,468,115 issued on Nov. 21, 1995 to B. A. Alvis;
U.S. Pat. No. 5,772,388 issued on Jun. 30, 1998 to R. J. Clark;
U.S. Pat. No. 5,863,173 issued on Jan. 26, 1999 to R. A. Bremner.

As can be appreciated, the dual load trailers of the prior art are not intended for use as boat lifts, and the prior boat lifts are not intended to be used as dual load trailers. Therefore, it is believed that there continues to be a need for a transformable trailer and watercraft lift which can be left in the water during the summer period and converted into a trailer for transporting several recreational vehicles after a vacation period and for supporting these vehicles in storage during winter.

SUMMARY OF THE INVENTION

The present invention provides for a recreational vehicle support apparatus which is transformable from a boat lift to a trailer. In the boat lift mode, the apparatus is movable on skids and has an inclination-adjustable cradle to accommodate an installation of the apparatus on a sloping shore. In the trailer mode, the apparatus has a structure for transporting and storing several recreational vehicles thereon in a compact arrangement.

Broadly, in accordance with one feature of the present invention, there is provided an apparatus for raising a watercraft out of a body of water for protecting the watercraft from wave actions in that body of water. The apparatus comprises a main frame having an upper side and a lower side. A pair of skids are provided for moving and supporting the main frame on a ground surface. There are also provided a pair of post assemblies extending from the upper side of the main frame, and a pair of bar sets pivotally mounted to the post assemblies. Each bar set comprises a lever bar having a first end, a second end and a first pivot in an intermediated region thereof, the first pivot being movably mounted to one of the post assemblies. A cradle is pivotally connected to the first ends of the lever bars, and a pair of watercraft support beams are mounted in the cradle for supporting a watercraft therein. A cable and winch assembly is connected to the main frame and to the second ends of the lever bars for tilting the lever bars about their respective first pivots and for raising and lowering the cradle relative to the main frame.

The apparatus is particularly advantageous for raising and supporting a watercraft out of a body of water when the apparatus is adapted to be partly submerged in that body of water.

In accordance with another aspect of the present invention, each bar set comprises the lever bar, and a follower bar pivotally connected to the cradle and to one of the post assemblies. The follower bar extends parallel to the lever bar and defines with the lever bar, with the post assembly and with the cradle a pantographic linkwork for maintaining fixed the cradle's inclination relative to the post assemblies.

In accordance with still another feature of the present invention, the cradle comprises a leveling mechanism for adjusting the cradle's inclination relative to the post assemblies. The leveling mechanism is particularly advantageous for adjusting the cradle on a level when the apparatus is installed on a sloping shore, thereby obviating the need for outriggers on the main frame.

In accordance with another aspect of the present invention, there is provided an apparatus for transporting several recreational vehicles thereon. The apparatus comprises a main frame having an upper side, a lower side, a front end and a rear end and defining a platform. A set of wheels is mounted to the lower side of the main frame for supporting the main frame off the ground. A hitch bar is connected to the front end of the main frame for selectively pulling the main frame behind a tow vehicle. The apparatus also comprises a pair of post assemblies extending from the upper side of the main frame, and a pair of bar sets pivotally mounted to the post assemblies. Each of the bar sets comprises a lever bar having a first end, a second end and a first pivot in an intermediated region thereof, the first pivot being movably mounted to one of the post assemblies. A cradle is pivotally affixed to the first ends of the lever bars. An upper deck framework is affixed to the front end of the main frame and to the post assemblies, and extends above the front end of the main frame. A first pair of wheel ramps is mounted to the upper deck framework, and a second pair of wheel ramps is mounted into the cradle. A cable and winch assembly is connected to the main frame and to the second ends of the lever bars for tilting the lever bars about their respective first pivots, and for raising and lowering the cradle relative to the main frame. The cradle is movable from the platform to the upper deck framework.

The cradle is usable for raising and moving a first recreational vehicle over the first wheel ramps above the front end of the platform and for raising a second recreational vehicle above the rear end of the platform. The platform is usable for carrying a third recreational vehicle under the first and second recreational vehicles.

In a further feature of the present invention, the upper deck framework and the first wheel ramps are inclined forwardly downward, and the second wheel ramps are inclined rearwardly downward. This particular feature is appreciable for simultaneously transporting three recreational vehicles in a compact arrangement wherein the center of gravity of the entire trailer load is relatively low.

Still another feature of the invention is that it is susceptible of a low cost of manufacture with regard to materials, equipment and labour, and which accordingly is then susceptible of low price of sale to the industry, thereby making such recreational vehicle support apparatus economically available to the public.

Other advantages and novel features of the invention will become apparent from the following detailed description.

BRIEF DESCRIPTION OF THE DRAWINGS

A preferred embodiment of the present invention selected by way of examples will now be described with reference to the accompanying drawings in which:

FIG. 6 illustrates a top plan view of the support apparatus according to the preferred embodiment, with the wheel ramps mounted thereon;

FIG. 7 illustrates a side view of the support apparatus as illustrated in FIG. 6, but without the wheel ramps;

FIG. 8 illustrates the rear view of the support apparatus as illustrated in FIG. 7;

FIG. 11 illustrates an enlarged side view of the cradle shown in FIGS. 1 to 10;

FIG. 12 illustrates a partial rear view of the cradle shown in FIG. 11;

FIG. 13 illustrates a top view of a left watercraft support beam mountable in the cradle and on the platform of the support apparatus for supporting a watercraft;

FIG. 14 illustrates a side view of the watercraft support beam illustrated in FIG. 13;

FIG. 15 illustrates an end view of the watercraft support beam illustrated in FIGS. 13 and 14;

FIG. 16 illustrates a partial section view of the transverse beam mountable on the support apparatus for supporting the rear ends of the forward wheel ramps;

FIG. 17 illustrates a top view of a left side forward wheel ramp mountable on the support apparatus and usable in a pair for supporting an ATV for example, over the front portion of the support apparatus;

FIG. 18 illustrates a side view of the forward wheel ramp illustrated in FIG. 17;

FIG. 19 illustrates a top view of a left side rear wheel ramp mountable on the cradle of the support apparatus and usable in a pair for supporting an ATV for example, over the rear portion of the support apparatus;

FIG. 20 illustrates a side view of the rear wheel ramp illustrated in FIG. 19.

DETAILED DESCRIPTION OF THE PREFERRED EMBODIMENT

Figure 1:
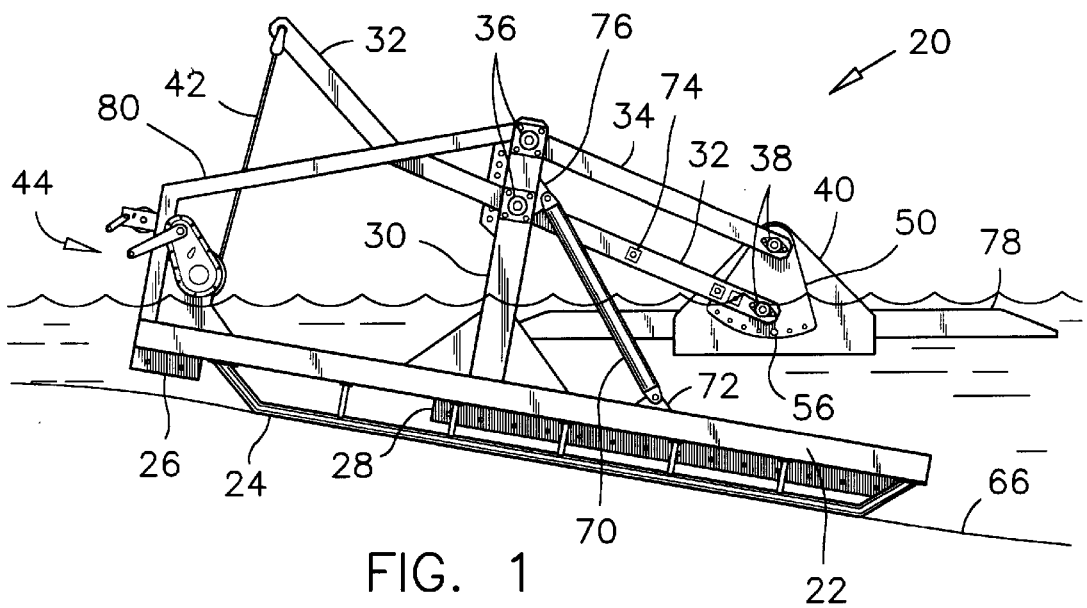
FIG. 1 illustrates the support apparatus according to the preferred embodiment in a boat lift mode, partly submerged, with the cradle thereof in a low position below the water level.

While this invention is susceptible of embodiments in various forms, there is shown in the drawings and will be described in details herein one specific embodiment, with the understanding that the present disclosure is to be considered as an example of the principles of the invention and is not intended to limit the invention to the embodiment illustrated.

Figure 2:
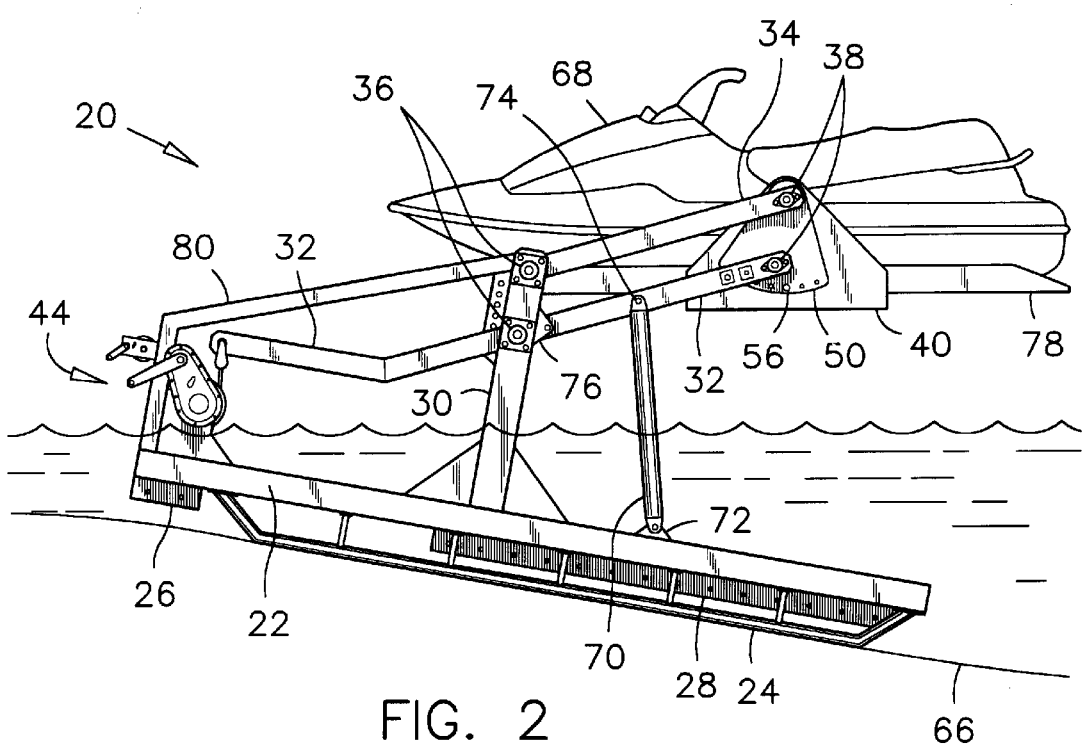
FIG. 2 illustrates the support apparatus as illustrated in FIG. 1, in a boat lift mode with the cradle thereof in a raised position and supporting a watercraft above the water level.

Referring particularly to FIGS. 1 and 2, there is illustrated therein the support apparatus 20 according to the preferred embodiment of the present invention in a boat lift mode. The support apparatus 20 comprises a rectangular main frame 22 which is supported on the ground, in a boat lift mode, by a pair of skids 24. Under the forward end of the main frame 22, there is provided a hitch socket 26 for retaining a hitch bar as will be seen on other drawings. Under the central and rear portion of the main frame 22, there is provided a pair of rails 28 for selectively supporting a set of wheels and for allowing the apparatus to be used as a trailer.

Two post assemblies 30 are mounted to the upper side of the main frame 22. Two parallel bar sets, each comprising a lower lever bar 32 and an upper follower bar 34 are pivotally mounted to the upper ends of a respective post assembly 30. Each lever bar 32 has a central pivot in an intermediate region thereof, which extends through one of the lower central bearings 36 affixed to the post assemblies 30. Each follower bar 34 is also pivoted through one of the upper central bearings 36.

The lever bars 32 are movable up and down, in see-saw-like movements about the lower central bearings 36. The rear ends of the lever bars 32 and of the follower bars 34 have rear bearings 38 to which a cradle 40 is movably mounted. The distance between the central bearings 36, measured at right angle with the main frame 22 is a same distance as the corresponding spacing between the rear bearings 38 such that the lever bar 32 and the follower bar 34 in a same set form a pantographic linkwork for maintaining the cradle 40 is a same inclination during up and down movements of the lever bars 32.

The front end of each lever bar 32 is connected to a cable 42 and a winch assembly 44, whereby the lever bars 32 and the cradle 40 can be raised and lowered by working the winch assembly 44. The winch assembly 44 is preferably a manual device whereby the support apparatus 20 is operable manually without external source of power.

One of the most important feature of the support apparatus 20 according to the preferred embodiment is found in the structure of the cradle 40, and in the leveling mechanism thereof. On each side of the cradle 40 there is provided a leveling plate 50, which is better illustrated in FIGS. 11 and 12. The leveling plate 50 is movable relative to the side plate 52 of the cradle 40, about the pivot bearing 54 mounted to and extending through both plates 50 and 52. The leveling plate 50 is retained to the side plate 52 by the bearing 54 and by a machine screw 56 threaded in a single socket 58 through the side plate 52, or by a pin or other dowel means. The machine screw 56, the pin or other dowel means, is mounted through the leveling plate 50 in one of several holes 60 disposed in a radial array through the leveling plate 50 about and below the pivot bearing 54. When the leveling plate 50 is adapted to be held in a fixed alignment to the lever bar 32 and to the follower bar 34, the side plate 52 and the cradle 40 are movable to various positions relative to the leveling plate 50 about the pivot bearing 54. These various positions correspond to the positions of the holes 60 in the radial array.

Each pivot bearing 54 comprises an upper stub shaft 62 to which the rear bearing 38 on one of the follower bars 34 is mounted. Each leveling plate 50 also comprises a lower stub shaft 64 affixed thereto, to which the rear bearing 38 of one of the lever bars 32 is mounted. Therefore, as explained before when making reference to the pantographic linkwork, the alignment of the leveling plate 50 remains constant relative to the alignment of the post assemblies 30. The alignment of the cradle 40, however, is adjustable relative to the alignment of the post assemblies 30 by means of the pivot bearing 54, the machine screw 56 and the array of holes 60. The leveling of the cradle 40 is effected by removing the machine screw 56 from the socket 58, adjusting the angular position of the cradle and installing the machine screw 56 in a different hole 60.

Referring back to FIGS. 1 and 2, it can be appreciated that an advantage of the leveling feature of the cradle 40 is that the support apparatus 20 can be pushed on a shore on its skids 24. The leveling of the cradle 40 is effected to compensate for the slope of the ground 66 on that particular shore. A watercraft 68 can thereby be supported in a leveled manner without having recourse to outriggers as known to be used in prior art devices. As may be appreciated, the support apparatus 20 is preferably installed on a sloping shore that is relatively flat transversally. The support apparatus 20 is also preferably anchored in place using stakes, moorings, ballast or otherwise to prevent it from moving under wave actions.

Another advantage of the described installation and especially of the skids 24 as compared to outriggers of the prior art, is that the support apparatus 20 is very stable in use when supporting a watercraft, despite more or less solid soils under the apparatus as typically found along lake shores and river beds.

In use when supporting a watercraft 68, a pair of prop bars 70 is preferably used for partly supporting the weight of the watercraft 68 and for preventing applying tension on the cables 42 and on the winch assembly 44 for extended periods of time. Each prop bar 70 is preferably pivoted to a lower holed plate 72 on the main frame 22 and is anchored to one of several intermediate stub shafts 74 affixed to the lever bars 32. When not used, each prop bar 70 is connected to an upper holed plate 76 affixed to one of the post assemblies 30. The connections of the prop bars 70 to the intermediate stub shafts 74 or holed plates 76 are preferably effected with hitch pins and hitch clips (not shown) such that the working of these bars 70 is done without tool.

In the boat lift mode, a pair of watercraft support beams 78 are mounted in the cradle 40. These support beams 78 are also preferably affixed to the cradle 40 by hitch pins and clips as will be understood from the present disclosure.

Figure 3:
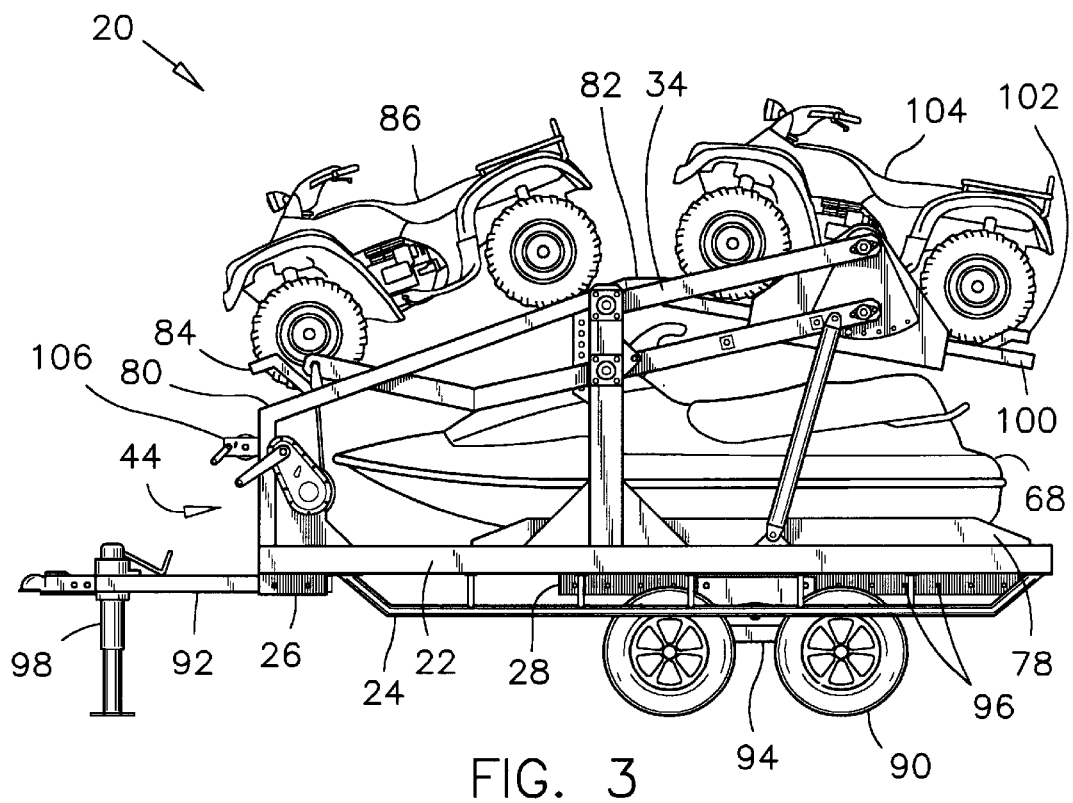
FIG. 3 illustrates the support apparatus according to the preferred embodiment in a trailer mode and carrying a watercraft and two ATVs.

Referring now to FIG. 3, the preferred support apparatus 20 has an upper deck framework 80 affixed to the front portion of the main frame 22 and to the upper part of the post assemblies 30. A pair of forward wheel ramps 82 having forward wheel chocks 84 are mountable to this upper deck framework 80 for supporting an ATV 86 for example above the forward end of the main frame 22.

When the support apparatus 20 is used in a trailer mode, two pairs of tandem wheels 90 are mounted under the main frame 22 and a trailer hitch bar 92 is mounted into the hitch socket 26. The beams and braces 94 of the tandem wheels are preferably mounted in an adjustable manner along the rails 28 to provide the ability to adjust and obtain an ideal weight distribution on the wheels 90 and the hitch bar 92. For this purpose, a series of holes 96 are provided through the rails 28, and the beams and braces 94 are mounted to the rails 28 by means of bolts or pins through these holes 96.

The mounting of the beams and braces 94 to the rails 28 of the support apparatus with bolts or pins is also advantageous for easily removing the wheels from the main frame 22 when the support apparatus is prepared for use as a boat lift. The removal of the tandem wheels 90 is preferably effected by blocking the rear end of the main frame 22 at a fixed height above the ground, and by operating the hitch jack 98 for raising the wheels 90 off the ground such that they can be removed. It will also be appreciated that the hitch jack 98 can also be used in association with two additional bumper jacks for example, to remove or install the tandem wheels 90 with ease.

In the preferred support apparatus, there is also provided a pair of rear wheel ramps 100 each having a rear wheel chock 102. The rear wheel ramps 100 are mountable to the cradle 40 in replacement of the watercraft support beams 78 mentioned before, for supporting a second ATV 104 in the cradle 40.

In a preferred trailer mode, the watercraft support beams 78 are attached to the main frame 22, and a watercraft 68 is pulled thereon and under both ATVs 86 and 104, by means of a second winch 106 affixed to the front portion of the upper deck framework 80. The support apparatus 20 is thereby usable for transporting and storing a pair of ATVs and a watercraft 68.

The leveling mechanism of the cradle 40 is also advantageous for inclining the rear wheel ramps 100 rearwardly such that the center of gravity of the rear ATV 104 is lowered as close as possible from the rear end of the watercraft 68. For a similar purpose, the upper deck framework 80 is inclined forwardly downward according to the typical forward tapering shape of a watercraft 68. The loaded support apparatus 20 thereby has a low center of gravity and is more stable when towed behind a vehicle, as compared to some double deck trailers of the prior art. It will be appreciated that tie straps (not shown) are also used to retain both ATVs 86, 104 and the watercraft 68 to the support apparatus 20 when the support apparatus is used in a trailer mode and is towed.

Figure 4:
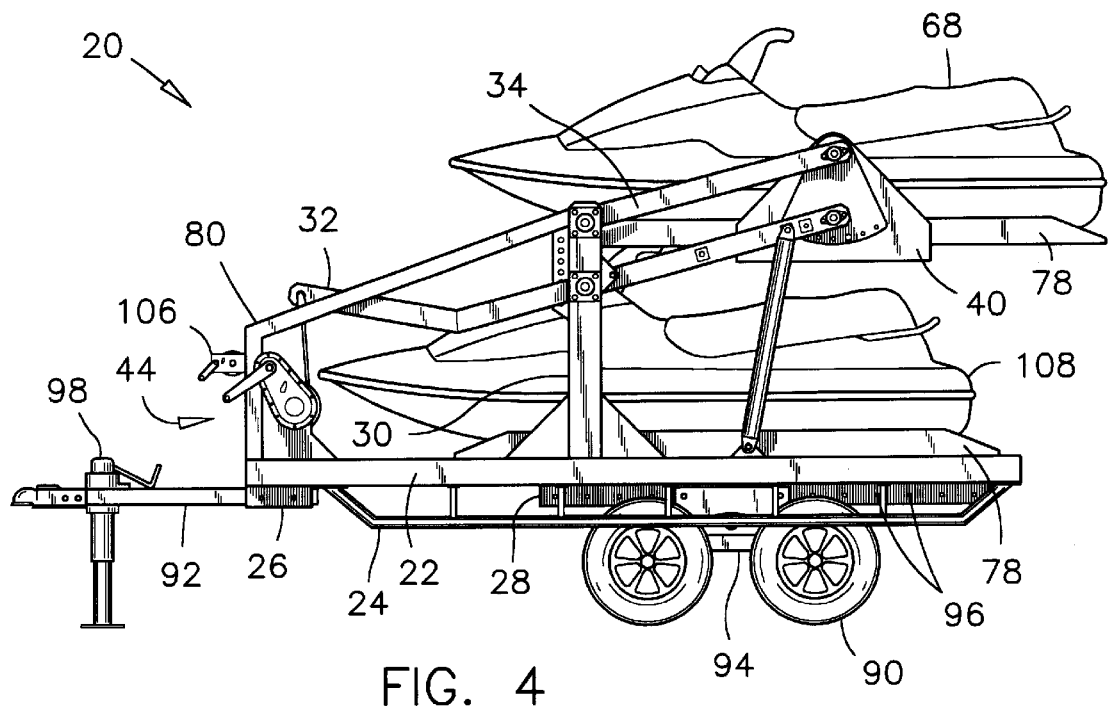
FIG. 4 illustrates the support apparatus carrying a pair of watercrafts.
Figure 5:
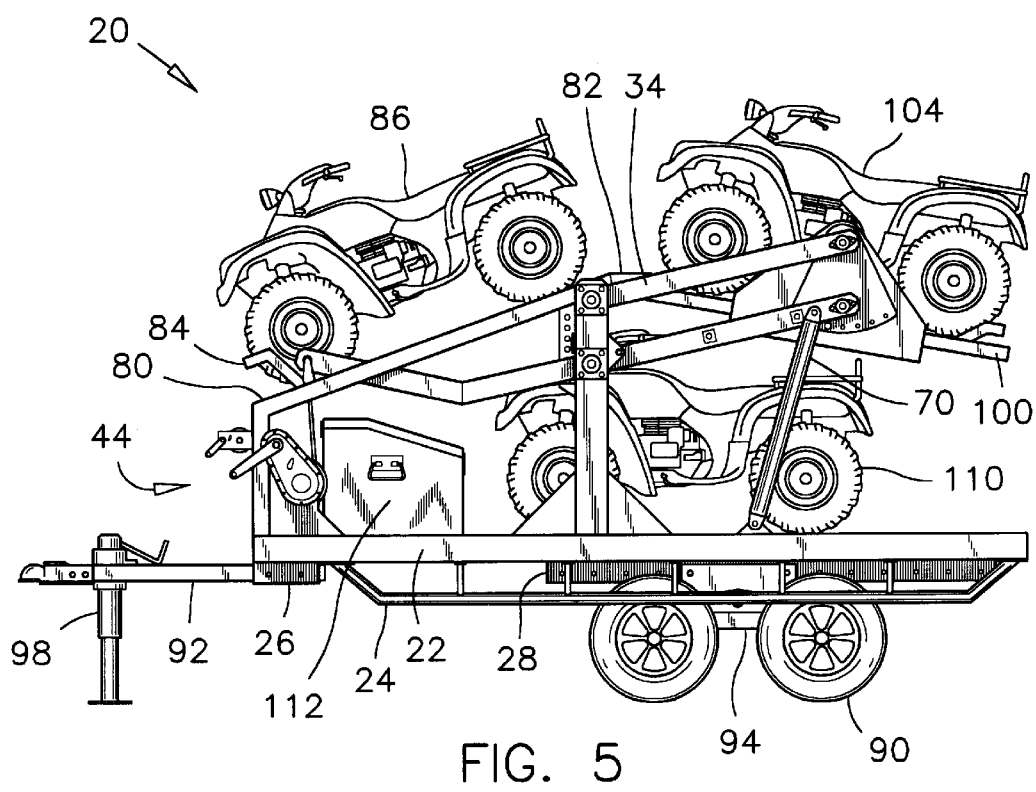
FIG. 5 illustrates the support apparatus carrying three ATV's.

And of course, two pairs of watercraft support beams 78 may also be mounted to the support apparatus 20 for supporting and transporting two watercrafts 68, 108, one over the other in an arrangement such as illustrated in FIG. 4. Similarly, it will be appreciated that the support apparatus 20 is also usable for transporting two ATVs 86, 104 on the upper deck and on the cradle, and one or two additional ATVs 110 with outing equipment 112 on the lower deck as shown in FIG. 5. In this arrangement also, the center of gravity of the entire load is lower than a same load carried on trailers of the prior art having parallel upper and lower decks. When the support apparatus is used exclusively for transporting winter sport equipment, it will be appreciated that a snowmobile may be carried on the lower deck.

Referring now to FIGS. 6 to 8, the basic structure of the support apparatus 20 is illustrated in greater details. Each post assembly 30 comprises an outer post 120 and an inner post 122, between which, one of the lever bars 32 and one of the follower bars 34 are mounted. On each inner post 122, there is provided a perforated flat bar 124 for retaining a transverse beam 126 at various heights. The transverse beam 126 is used for supporting the rear end of the forward wheel ramps 82 as will be further explained when making reference to FIGS. 16, 17 and 18.

Referring to FIGS. 6 and 8 in particular, the winch assembly 44 is comprised of a gear or chain drive 130 connected to two cable spools 132, 134 mounted on a common shaft 136. Each spool 132, 134 is aligned with a respective lever bar 32 for receiving the cable 42 actuating each lever bar.

Figure 9:
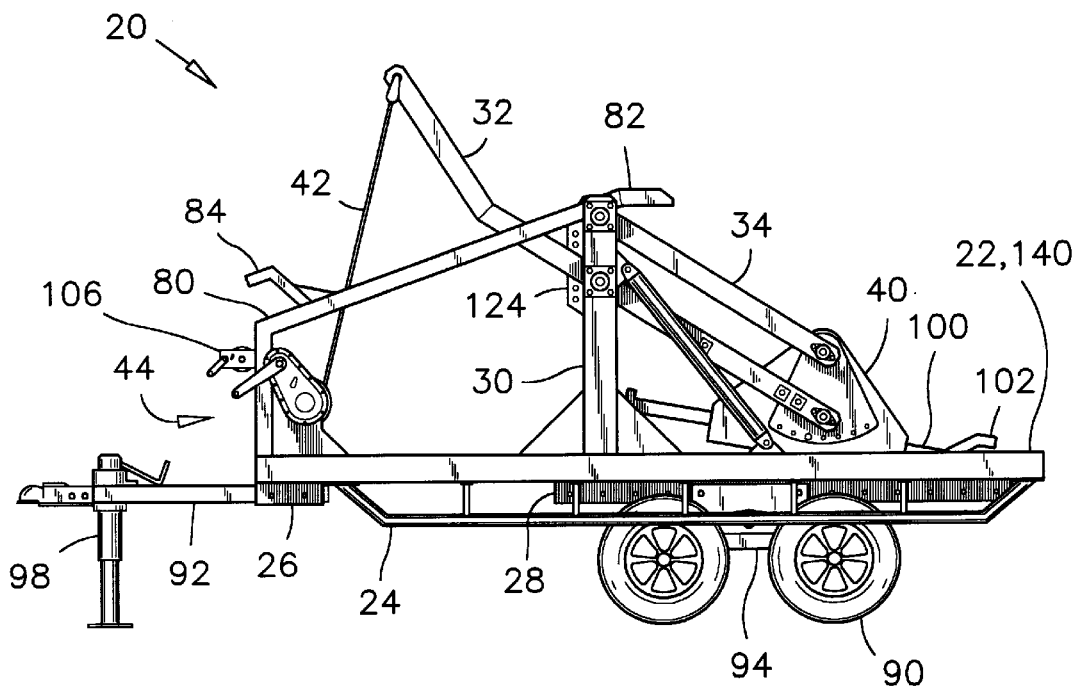
FIG. 9 illustrates a side view of the support apparatus with the cradle in a lowermost position.

The main frame 22 of the support apparatus defines a platform area 140 which is covered by galvanised steel grating 142 for example. The rear portion of the platform area 140 has an open space 144 which is larger than the overall dimensions of the cradle 40, such that the cradle 40 can be lowered through the platform area, as illustrated in FIG. 9. This feature is advantageous for allowing an easy loading of an ATV into the cradle 40 and over the rear wheel chock 102 of the rear wheel ramps 100.

Figure 10:
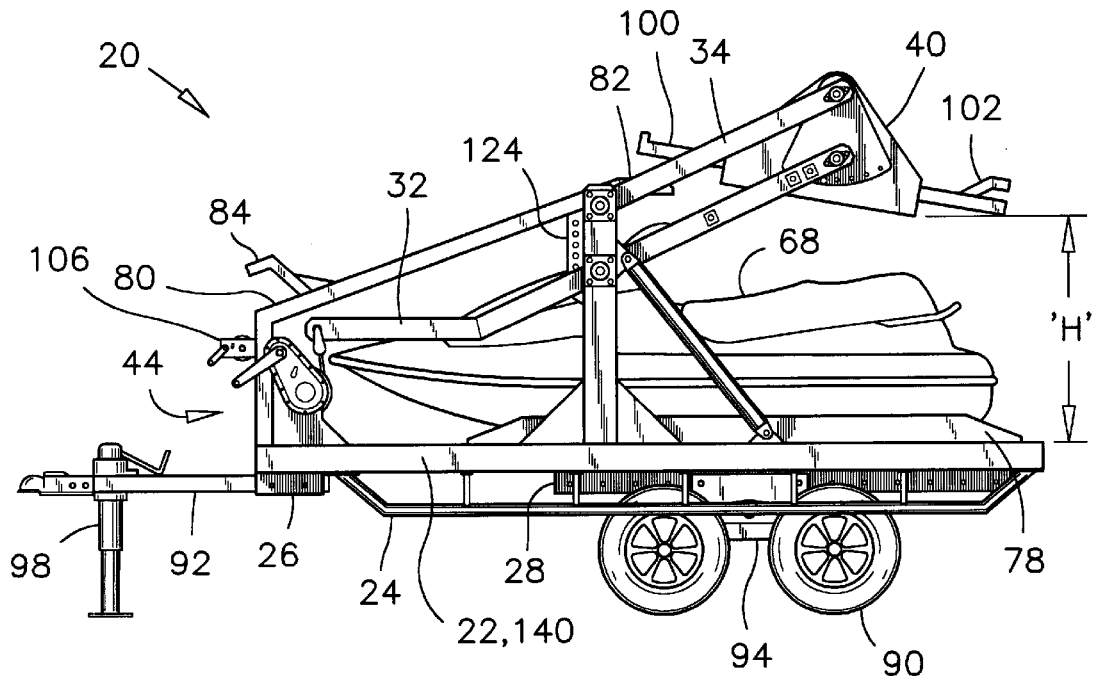
FIG. 10 illustrates another side view of the support apparatus, with the cradle in an uppermost position.

In the preferred embodiment, the cradle 40 can be raised above the platform 140, a distance 'H' which is greater than the overall height of a watercraft 68 resting on support beams 78 mounted over the platform 140, as illustrated in FIG. 10. The loading of a watercraft 68 on the platform 140, using the second winch 106 can thereby be effected while other vehicles are carried on the upper deck framework 80 and in the cradle 40.

The watercraft support beams 78 may have numerous shapes that are known in the art, and therefore a beam having a substantially rectangular cross-section is illustrated herein to simplify the drawings. However, each watercraft support beam 78 used in the preferred support apparatus has two or more angle brackets 150 as shown in FIGS. 13–15, for allowing a mounting thereof to the structural members of the main frame 22 with bolts or pins (not shown). The preferred watercraft support beam 78 also has first and second channel members 152, 154 which have respective dimensions for enclosing one of the framing members 156 of the cradle 40, as shown in FIGS. 6, 8 and 12. The first and second channel members 152, 154 are retainable to the framing members 156 of the cradle 40 by hitch pins and clips (not shown) through the holes 158 in these channel members.

The preferred transverse beam 126, as partly illustrated in FIG. 16, has at least one retractable end 160 which is urged outwardly by a spring 162 mounted inside the beam. The retractable end 160 is movable by means of a knob 164 sliding along a slot 166 through the wall of the beam. The transverse beam 126 is mountable at various heights along the post assemblies 30 through the perforated flat bars 124, for supporting the rear end of the forward wheel ramps 82 at different heights above the platform 140.

Referring now to FIGS. 17–20, the forward and rear wheel ramps 82 and 100 are illustrated in details. Only the left side wheel ramps are illustrated, the right side wheel ramps being mirror images. The forward wheel ramps 82 are retained to the transverse beam 126 and to the upper deck framework 80 by means of third and fourth channel members 170 and 172 and hitch pins and clips (not shown). Similarly, the rear wheel ramps 100 are mounted to the cradle's framing members 156 by means of fifth and sixth channel members 174, 176, and hitch pins and clips one of which is illustrated and labelled as 178.

The rear end of the forward wheel ramp 82 preferably has a longitudinal recess 180 therein, which is adapted to partly enclose a corresponding tongue 182 on the front end of the rear wheel ramp 100, when the rear wheel ramps 100 are brought in vertical alignment with the forward wheel ramps 82, as illustrated in FIGS. 3, 5 and 6. This feature is appreciable for maintaining a lateral alignment of the front and rear wheel ramps during loading of a vehicle on the upper deck of the support apparatus, and during the transport of vehicles with the support apparatus.

As to other manner of usage and operation of the instant invention, the same should be apparent from the above description and accompanying drawings, and accordingly, further discussion related to these aspects of the invention would be considered repetitious and is not provided.

While one embodiment of the present invention has been illustrated in the accompanying drawings and described hereinabove, it will be appreciated by those skilled in the art that various modifications, alternate constructions and equivalents may be employed without departing from the true spirit and scope of the invention. For example, a substitution of hydraulic actuators for the winch assembly, or particular dimensions for handling specific types of wheeled vehicles only, are considered to be designer's choices included within the scope of the present invention. Therefore, the above description and the illustrations should not be construed as limiting the scope of the invention which is defined by the appended claims.

We claim:

1. An apparatus for raising a watercraft out of a body of water for protecting said watercraft from wave actions in said body of water, said apparatus comprising:
   a main frame having an upper side and a lower side;
   a pair of skids mounted to said lower side for movably supporting said main frame on a ground surface;
   a pair of post assemblies extending from said upper side;
   a pair of bar sets pivotally mounted to said post assemblies; each of said bar sets comprising a lever bar having a first end, a second end, a length and a first pivot in an intermediated region thereof, said first pivot being movably mounted to one of said post assemblies;
   a cradle pivotally affixed to said first ends of said lever bars; and
   a cable and winch assembly connected to said main frame and to said second ends of said lever bars for moving said second ends and for raising and lowering said cradle relative to said main frame;
   such that said cradle is usable for raising a watercraft out of a body of water when said apparatus is adapted to be partly submerged in said body of water.

2. The apparatus as claimed in claim 1, wherein each of said bar sets comprises a follower bar extending parallel to said lever bar and defining with said lever bar, with one of said post assemblies and with said cradle a pantographic linkwork for maintaining said cradle in alignment with said post assemblies during raising and lowering movements of said cradle.

3. The apparatus as claimed in claim 1, further comprising a pair of rails mounted to said lower side of said main frame, each said rails having means for detachably retaining wheels thereto for selectively supporting said main frame on wheels.

4. The apparatus as claimed in claim 3, further comprising a hitch socket mounted to said lower side of said main frame, for selectively retaining a hitch bar to said main frame.

5. The apparatus as claimed in claim 1, further comprising a pair of prop bars connected to said main frame and to said lever bars between said post assemblies and said cradle, for partly supporting said lever bars and said cradle therewith.

6. The apparatus as claimed in claim 2, further comprising a leveling mechanism for changing an inclination of said cradle relative to said post assemblies.

7. The apparatus as claimed in claim 6, wherein said cradle comprises a side plate and said leveling mechanism comprises a leveling plate movably connected to said side plate and to one of said bar set, said leveling plate having a series of holes therein and said leveling mechanism also comprises a screw mounted through one of said holes and through said side plate.

8. An apparatus for transporting recreational vehicles, said apparatus comprising:
   a main frame having an upper side, a lower side, a front end and a rear end;
   a set of wheels mounted to said lower side of said main frame for supporting said main frame off the ground;
   a hitch bar connected to said front end of said main frame for pulling said main frame behind a tow vehicle;
   a pair of post assemblies extending from said upper side of said main frame;
   a pair of bar sets pivotally mounted to said post assemblies; each of said bar sets comprising a lever bar having a first end, a second end, a length and a first pivot in an intermediated region thereof, said first pivot being movably mounted to one of said post assemblies;
   a cradle pivotally affixed to said first ends of said lever bars;
   an upper deck framework affixed to said front end of said main frame and to said post assemblies and extending above said front end of said main frame;
   a first pair of wheel ramps mounted to said upper deck framework;
   a second pair of wheel ramps mounted in said cradle, and
   a cable and winch assembly connected to said main frame and to said second ends of said lever bars for moving said second ends and for raising and lowering said cradle relative to said main frame;
   said cradle being movable from said main frame to said upper deck framework;
   such that said cradle is usable for raising and moving a first recreational vehicle over said first wheel ramps above said front end of said main frame and for raising a second recreational vehicle above said rear end of said main frame and said main frame is usable for carrying a third recreational vehicle under said first and second recreational vehicles.

9. The apparatus as claimed in claim 8, wherein said upper deck framework and said first wheel ramps are inclined forwardly downward.

10. The apparatus as claimed in claim 9, wherein said second wheel ramps are inclined rearwardly downward.

11. The apparatus as claimed in claim 10, further comprising a pair of watercraft support beams mounted on said upper side of said main frame.

12. The apparatus as claimed in claim 8, further comprising a pair of rails mounted to said lower side of said main frame, and said set of wheels are adjustably mounted to said rails.

13. The apparatus as claimed in claim 8, wherein each of said bar sets comprises a follower bar extending parallel to said lever bar and defining with said lever bar, with one of said post assemblies and with said cradle a pantographic linkwork for maintaining said cradle in alignment with said post assemblies.

14. The apparatus as claimed in claim 13, further comprising a leveling mechanism for changing an inclination of said cradle relative to said post assemblies.

15. An apparatus for alternate uses between a boat lift and a trailer, said apparatus comprising:
   a main frame having a front end, a rear end, and upper side, a lower side and said upper side defining a platform;
   a set of wheels removably mounted to said lower side of said main frame for supporting said main frame off the ground;
   a hitch bar connected to said front end of said main frame for pulling said main frame behind a tow vehicle;
   a pair of skids mounted to said lower side of said main frame for alternatively supporting said main frame on a ground surface when said set of wheels is removed from said main frame;

a pair of post assemblies extending from said upper side of said platform;

a pair of bar sets pivotally mounted to said post assemblies; each of said bar sets comprising a lever bar having a first end, a second end, a length and a first pivot in an intermediated region thereof, said first pivot being movably mounted to one of said post assemblies;

a cradle pivotally affixed to said first ends of said lever bars, and a cable and winch assembly connected to said main frame and to said second ends of said lever bars, for moving said second ends and for raising and lowering said cradle relative to said main frame;

such that said cradle is usable for raising a watercraft out of a body of water when said apparatus is adapted to be partly submerged in said body of water, and said apparatus is also usable for simultaneously transporting at least two recreational vehicles, one in said cradle and one on said platform below said cradle.

16. The apparatus as claimed in claim 15, wherein each of said bar sets comprises a follower bar extending parallel to said lever bar and defining with said lever bar, with one of said post assemblies and with said cradle a pantographic linkwork for maintaining said cradle in alignment with said post assemblies.

17. The apparatus as claimed in claim 15, further comprising a leveling mechanism on said cradle for changing an inclination of said cradle relative to said post assemblies.

18. The apparatus as claimed in claim 17, wherein said cradle comprises a side plate and said leveling mechanism comprises a leveling plate movably connected to said side plate and to one of said bar set, said leveling plate having a series of holes therein and said leveling mechanism also comprising a screw mounted through one of said holes and through said side plate.

19. The apparatus as claimed in claim 18, further comprising:

an upper deck framework affixed to said front end of said main frame and to said post assemblies, above said front end of said main frame;

a first pair of wheel ramps mounted to said upper deck framework;

a second pair of wheel ramps mounted in said cradle, and a pair of watercraft support beams mounted to said upper side of said main frame.

20. The apparatus as claimed in claim 19, wherein said upper deck framework and said first wheel ramps are inclined forwardly downward, and said second wheel ramps are inclined rearwardly downward.

\* \* \* \* \*